(12) United States Patent
Henes Neto et al.

(10) Patent No.: US 9,418,258 B2
(45) Date of Patent: Aug. 16, 2016

(54) DATA-DETECTOR CIRCUIT FOR RFID TAGS

(71) Applicants: Egas Henes Neto, Porto Alegre-RS CEP (BR); Laurent Courcelle, Porto Alegre-RS CEP (BR)

(72) Inventors: Egas Henes Neto, Porto Alegre-RS CEP (BR); Laurent Courcelle, Porto Alegre-RS CEP (BR)

(73) Assignee: CEITEC S.A., Porto Alegre (BR)

( * ) Notice: Subject to any disclaimer, the term of this patent is extended or adjusted under 35 U.S.C. 154(b) by 0 days.

(21) Appl. No.: 14/381,254

(22) PCT Filed: Dec. 20, 2012

(86) PCT No.: PCT/BR2012/000551
§ 371 (c)(1),
(2) Date: Aug. 27, 2014

(87) PCT Pub. No.: WO2013/126976
PCT Pub. Date: Sep. 6, 2013

(65) Prior Publication Data
US 2015/0154425 A1    Jun. 4, 2015

(30) Foreign Application Priority Data
Feb. 27, 2012   (BR) .................... 10 2012 004201 0 0

(51) Int. Cl.
*G06K 7/00*  (2006.01)
*G06K 7/10*  (2006.01)
*H04B 5/00*  (2006.01)
*G06K 19/077*  (2006.01)

(52) U.S. Cl.
CPC .......... *G06K 7/10009* (2013.01); *H04B 5/0062* (2013.01); *G06K 19/07749* (2013.01)

(58) Field of Classification Search
CPC ......... G06F 3/08; G06F 3/1454; G06K 17/00; G06K 7/008; G06K 13/08
USPC ........................................ 235/435, 439, 451
IPC ........... G06F 3/08, 3/1454; G06K 17/00, 7/008, G06K 13/08
See application file for complete search history.

(56) References Cited

U.S. PATENT DOCUMENTS

| | | |
|---|---|---|
| 7,783,205 B1 | 8/2010 | Chaney |
| 7,817,015 B1 | 10/2010 | Tiernay et al. |
| 8,314,685 B2 | 11/2012 | Balachandran et al. |
| 2006/0103457 A1 | 5/2006 | Kumar et al. |
| 2007/0046369 A1 | 3/2007 | Schober et al. |
| 2011/0304461 A1 | 12/2011 | Song et al. |
| 2012/0012655 A1* | 1/2012 | Kai et al. ...................... 235/439 |
| 2013/0155352 A1* | 6/2013 | Wicker .......................... 349/96 |

* cited by examiner

*Primary Examiner* — Karl D Frech
(74) *Attorney, Agent, or Firm* — Bay State IP, LLC (57) ABSTRACT

Data-detector circuit for RFID labels, wherein the package is detected using two circuits, a polarizing circuit and a polarized circuit. The polarization signal can be sent from the polarizing circuit to the polarized circuit via a low-pass filter. The reference signal for comparison with the package detected is generated on the basis of the package attenuated by means of a voltage splitter. The reference signal is filtered via a low-pass filter. The resulting circuit has the characteristics of low consumption and high sensitivity.

15 Claims, 9 Drawing Sheets

DATA-DETECTOR CIRCUIT FOR RFID TAGS

CROSS REFERENCE TO RELATED APPLICATION

This application is for entry into the U.S. National Phase under §371 for International Application No. PCT/BR2012/000551 having an international filing date of Dec. 20, 2012, and from which priority is claimed under all applicable sections of Title of the United States Code including, but not limited to, Sections 120, 363, and 365(c), and which in turn claims priority under 35 USC 119 to Brazilian Patent Application No. BR 10 2012 00420100 filed on Feb. 27, 2012.

BACKGROUND OF THE INVENTION

1. Field of the Invention

This invention of a Radio Frequency Identification Data-detector circuit for RFID labels applies in the commerce and service areas where there is a need for labeling goods and service orders. Commerce of goods and services has relied increasingly on labeling and electronic data reading of goods and services being marketed. An example of this are the labels containing bar codes that allow access to information about the product in a database, giving access to other information such as price, weight, quantity available in stock, etc.

2. Description of the Related Art

Bar codes are being replaced by RFID including labels, readers, etc. One advantage of using RFIDs is that information can be stored and rewritten on the label itself. Another advantage is that the label does not need to be correctly positioned in front of an optical reader, as with barcode labels.

Many of the RFID label circuits are passive. This invention can be implemented using semiconductor devices, in particular the passive RFID technology. The RFID technology has a large and growing number of applications that include vehicle identification, smart card systems, animal identification, and general applications in the field of logistics such as production and inventory control, in retail to replace the barcode labels, in airports to identify airline luggage, in healthcare to trace medicines.

Figure 1:
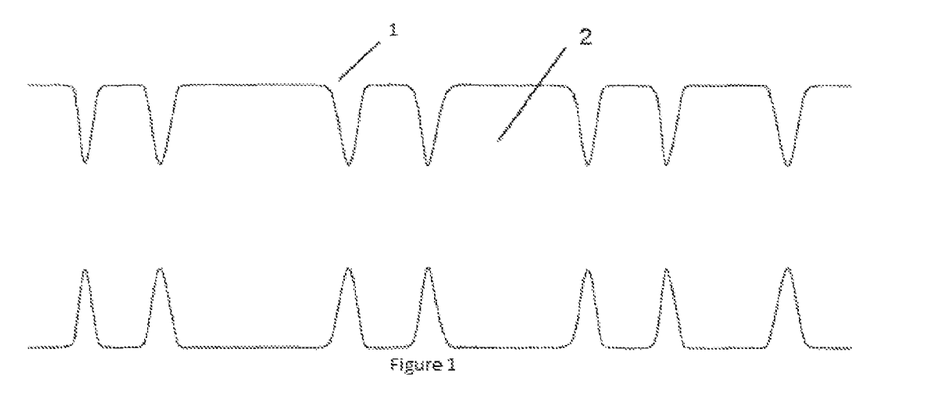
FIG. 1 shows an example of a signal to be received and demodulated. The signal is a high frequency signal (2) that oscillates within a range of values delimited by an envelope (1).
Figure 2:
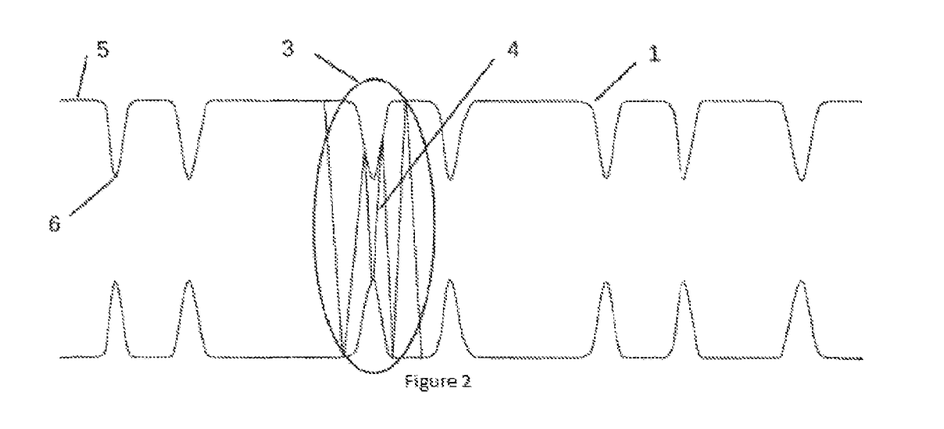
Figure 3:
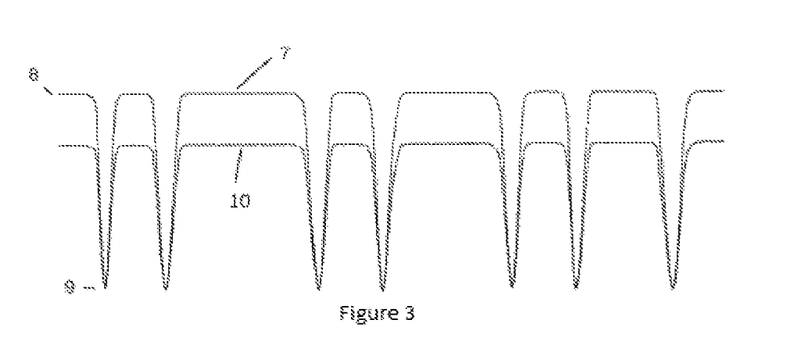
FIG. 3 shows the detected envelope (7) and an attenuated version at 75% (10) of the detected envelope (7).

In an RFID system, goods and services are labeled with RFID labels. In this system, it is desirable that the labels are easily read and without failures. Reading errors can occur if labels are far from the readers. These errors occur mainly in the case of passive RFID labels, which absorb energy from electromagnetic waves emitted by the reader, because the wave energy is attenuated with the square of the distance to the player. For this reason, it is important that passive RFID labels are able to operate with low power consumption. Thus, the labels are able to work even away from the reader, which increases label sensitivity and system reliability as a whole. An example of the signal being received and demodulated is shown in FIG. 1. The signal is a high frequency signal (2) that oscillates within a range of values limited by an envelope (1). FIG. 2 shows more details on the concept of modulation by amplitude. Within the ellipse (3) shown in FIG. 2 the oscillation of the high frequency signal is shown (4), which occurs within the envelope limits (1). The envelope will vary over time, and can reach a maximum high value (5) and a minimum high value (6). To demodulate the signal shown in FIGS. 1 and 2, it is necessary to detect the envelope (1). Typically the top of the envelope (1) is used to detect data. The detected envelope (7) must be compared to a reference as constant as possible. It is desirable that this constant reference is between the maximum high value (8) and the minimum high value (9) of the detected envelope (7). The data are detected by detecting intersections between the detected envelope (7) and the reference.

With help of FIG. 2, it is possible to understand that the low quality of the signal transmitted by the reader and received by the label is not connected only to the signal power, but also to the difference between the signals modulating the information, i.e., a high power signal but with a small relative difference between the maximum high value (5) and the minimum high value (6) of the package is difficult to be demodulated.

Circuits to detect data on the RFID labels already exist. Among the existing approaches, we can mention three types of circuit. A first class circuit uses voltage (level) displacer. The voltage level displacer operates displacing and/or amplifying the received signal package, as to facilitate signal demodulation by increasing the distance between the high part and the lower part of the package. A second class of circuits uses a mobile average to compare with the package. A third class of circuits uses a fixed reference voltage.

Circuits that use level shifters present problems in terms of distortion and consumption. The distortion problem is due to the maximum output voltage. Thus, if the input package is already high, it is not possible to increase the maximum high value (5) of the envelope (1) and the minimum high value (6) of the envelope (1) and the information can be lost, since the difference between the maximum high value (5) of the envelope (1) and the minimum high value (6) of the envelope (1) would decrease. The consumption problem occurs because the increase (voltage shifting) requires power, increasing circuit consumption.

Circuits using mobile average can present problems due to average variation. As the mobile average is not constant and varies with time. Thus, the intersection points between the package and the reference signal given by the mobile average can be either anticipated or delayed in relation and a constant ideal reference. This feature can lead to data loss due to loss of synchronism. Also, if the envelope stays too long in its maximum high value (5) or at its minimum high value (6) the average value used as reference can approach the value of the detected envelope itself (7), leading to false intersections between the average (used as reference) and the detected envelope (7). This problem is often treated with additional circuitry hysteresis, limiting the sensitivity, because in order to detect the difference between the maximum high value (8) of the detected envelope (7) and the minimum high value (9) of the detected envelope (7) must be higher than the hysteresis voltage value. Circuits that use fixed reference voltage can have problems with the envelope signal depth. If the fixed reference is greater than the maximum high value (8) of the detected envelope (7) or lower than the minimum high value (9) of the detected envelope (7), there is no intersection between the fixed reference and the detected envelope (7) and therefore the data is lost.

Furthermore, all three mentioned approaches have a linear or less than linear behavior regarding the detected envelope (7). It will be seen that the invention presents more than a linear gain by using a switching circuit that forces envelope detection upon approaching zero when the minimum high value (6) of the envelope (1) is detected.

SUMMARY OF THE INVENTION

The invention has several distinctive features. The first feature is the envelope detection (1) which is performed more efficiently with greater sensitivity, because two circuits are used to detect the envelope. One of the circuits, the polarizing detector circuit is used to polarize the other, the polarized detector circuit, ensuring that the polarized circuit has higher accuracy at envelope detection. The second feature is given by using a low-pass filter between the polarization signal that goes from the polarizing circuit to the polarized circuit. The third feature is the generation of the reference signal not from the envelope itself, but from the envelope attenuated through a voltage divider. The fourth feature is the use of a low-pass filter to generate the reference signal from the attenuated envelope produced in the voltage divider. A fifth feature is the low-pass filter, which is itself fed back to suppress rapid variation in the input signal, that must be filtered. These features can all be combined into a low power high quality detection circuit, or be used separately.

Now, the advantages of the invention and how they are derived from its innovative features will be discussed. The first advantage of the invention is more sensitive detection of the envelope (1), because the polarized circuit that effectively detects the package is polarized with a signal that depends on the package, generated by the polarizing circuit. Thus, polarized detector circuit is capable of detecting an envelope at low input voltage. The use of the low-pass filter to the polarization signal increases detection accuracy of the envelope because it turns off the polarized detection circuit when the antenna signal is near or below the minimum high value (6) of the envelope (1). This turning off is related to the more than linear response of the proposed circuit. The third advantage of the invention is to generate a high quality reference signal to compare with the envelope. The high quality of the reference signal is given by two features. The first feature that gives quality to the reference signal is its status between the maximum and minimum values of the voltage of the envelope. This feature is ensured by using the resistive divider to generate an attenuated envelope. The second feature that gives quality to the reference signal is its almost constant value. This feature is guaranteed because the reference signal is generated through a low pass filter.

BRIEF DESCRIPTION OF THE DRAWINGS

The invention will be better understood with the following detailed description, which will be better understood with the figures.

FIG. 2 shows more details on the concept of modulation by amplitude. Within the ellipse (3) shown in FIG. 2, the oscillation of the high frequency signal (4) is shown, which occurs within the package limits (1). The envelope varies over time, and can reach a maximum high value (5) and a minimum high value (6). To demodulate the signal shown in FIGS. 1 and 2, it is necessary to detect the envelope (1). Typically the top of the package (1) is used in data detection. The detected package (7) must be compared to a reference as fixed as possible, which is between the maximum high value (8) of the detected envelope (7) and a minimum high value (9) of the detected envelope (7), as shown in FIG. 3. Data are detected by detecting intersections between the detected envelope (7) and the reference.

FIG. 7 shows a version of the entire circuit, illustrating its components. The input signal comes from an antenna (13) that is connected both to the input of a polarized detector circuit (14) and the input of a polarizing detector circuit (15). The polarizing detector circuit (15) receives the signal from the antenna (13) and produces a polarization signal that is filtered by a low pass filter (16). The low pass filter (16) produces a filtered bias signal to be used for polarized detector circuit (14). The polarized detector circuit (14) receives the input signal to be demodulated from the antenna (13) and receives the polarization signal filtered from the low-pass polarization filter (16). From the two received signals, the polarized detector circuit (14) produces a detected envelope signal (7) which is used in a resistive divider (17) and also in the comparator (19) to produce the demodulated data in the circuit output node (20). The resistive divider circuit (17) receives the detected envelope (7) and produces an attenuated envelope (10) which is then filtered by the average low-pass filter (18). The average low-pass filter (18) receives the attenuated envelope (10) and produces an average signal (11) to be used as a reference in the comparator (19). The comparator (19) compares the detected envelope (7) received from the polarized detector circuit (14) with the average signal (11) received from the low-pass average filter (18), producing the demodulated data in the circuit output node (20).

FIG. 8 shows the composition of the polarized detector circuit (14). The circuit consists of a PMOS transistor (25) and a capacitor (24). The input signal to be demodulated (2) is connected to the source terminal (21) of the PMOS transistor (25). The polarization signal input is connected to the port terminal (22) of the PMOS transistor (25). Circuit output (23) is connected to the drain terminal of the PMOS transistor (25). The capacitor (24) is connected to the circuit output (23). To operate correctly, the polarized detector circuit needs a resistance connected to the output node, in parallel to the capacitor (24). To make it simple, the body terminal (or "bulk") of the transistor (25) is omitted in FIG. 8; the body terminal is connected to the output terminal (23) as well as the drain terminal of the transistor (25).

FIG. 10 shows the composition of the polarizing detector circuit (15). The circuit consists of a PMOS transistor (31), a capacitor (30) and a resistor (32). The input signal to be demodulated (2) is connected to the source terminal (27) of the PMOS transistor (31). The polarizing circuit detector (15) does not receive a polarizing signal, so the port terminal (28) of the PMOS transistor (31) is directly connected to the circuit output (29). Circuit output (29) is connected to the drain terminal of the PMOS transistor (31). The capacitor (30) is connected to the circuit output (29). To operate correctly, the polarizing detector circuit requires a resistor (32) connected to the output node (29) in parallel to the capacitor (30). To make it simple, the body terminal (or "bulk") of the transistor (31) is omitted in FIG. 10; the body terminal is connected to the output terminal (29) as well as the drain terminal of the transistor (31).

FIG. 11 shows the resistive voltage divider circuit (17). The circuit consists of two resistors shown in FIG. 11 numbered (35) and (36). The detected envelope signal input (7) is performed by the input terminal (33). The attenuated envelope (10) is available on the output node (34). The attenuation ratio depends on the specific values of the resistors.

FIG. 12 shows a possible composition for the low-pass filter circuit. This composition can be used for both the polarization low-pass filter (16) and for the average low-pass filter (18). The signal input to be filtered is performed by the input terminal (41) and the output of the filtered signal is performed by the output terminal (42). The circuit depends on two current sources i1 (40) and i2 (39). The higher the sum of the values of i1 (40) and i2 (39), the faster the output response (42) to follow the input signal. For this reason, current source i2 (39) is set to be significantly higher (about 20 times) than the current i1 (40). Current source i2 (39) can be turned off via a switch (38) which is controlled by an external on/off signal (37).

When the detected envelope (52) crosses the reference average (60) in the negative direction (62), the detected data has a high-to-low transition (64).

When the detected envelope (52) crosses the with the reference average (60) in the positive direction (63), the detected data has an low-to-high transition (65). Thus, it is possible to decode "1" (67) and "0" (66) binary states as encoded in the input signal.

DETAILED DESCRIPTION OF THE PREFERRED EMBODIMENTS

Figure 4:
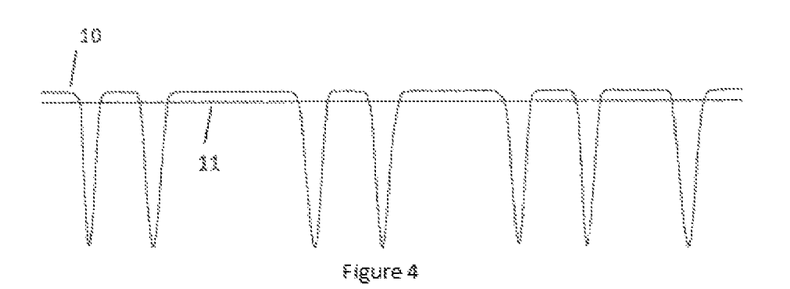
FIG. 4 shows the envelope attenuated at 75% (10) and an average signal (11) generated from the attenuated envelope (10) with a low-pass filter.
Figure 5:
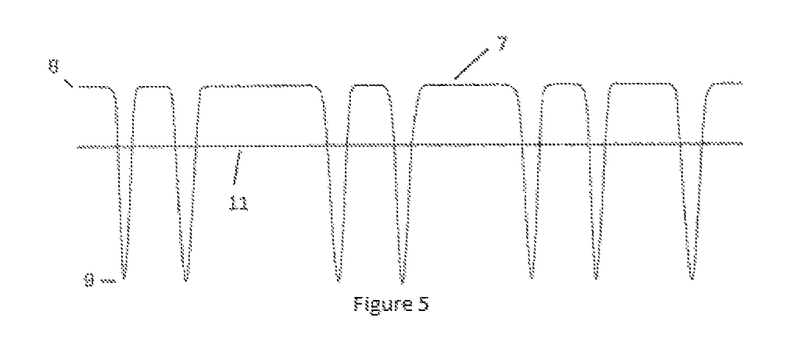
FIG. 5 shows the detected envelope (7) and an average signal (11) generated from the attenuated envelope at 75% (10) with a low-pass filter.
Figure 6:
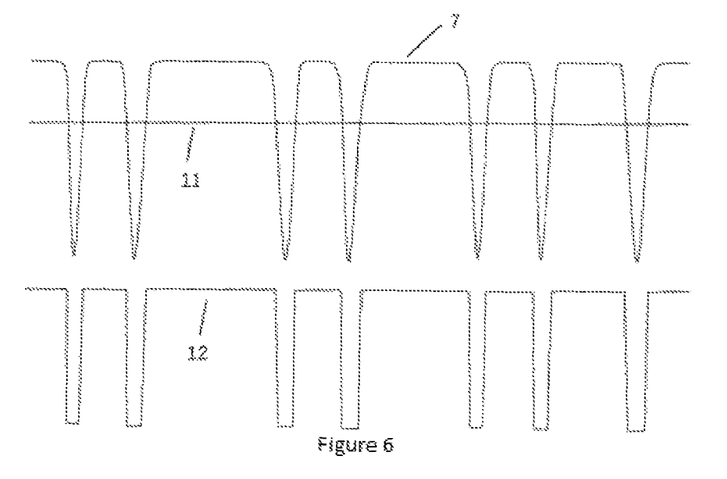
FIG. 6 shows a data signal (12) extracted by comparing the detected envelope (7) with an average signal (11) generated from the attenuated envelope at 75% (10) with a low-pass filter.
Figure 12:
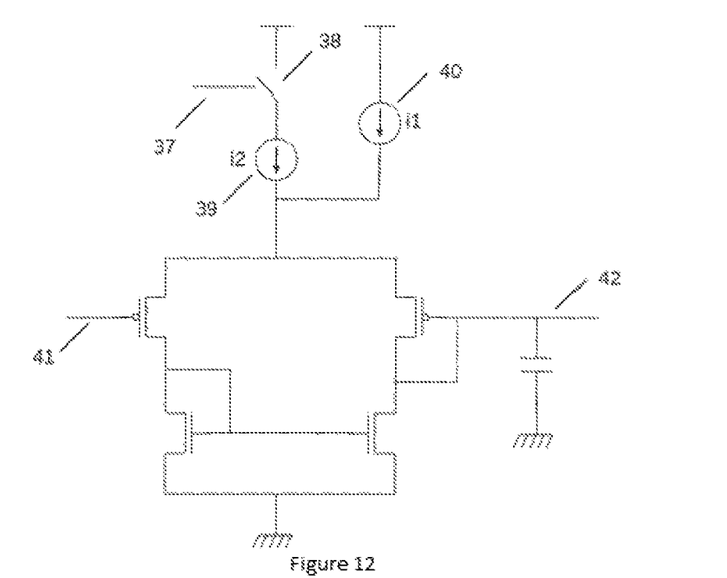

The invention has several distinctive features. The first feature is envelope detection (1), which is performed more efficiently and with greater sensitivity, because two circuits are used to detect the envelope. One of the circuits, the polarizing detector circuit (15) is used to polarize the other, the polarized detector circuit (14), ensuring that the polarized detector circuit (14) has higher accuracy at envelope demodulation (1). The second feature is given by using a low-pass filter (16) between the polarization signal going from the polarizing detector circuit (15) to the polarized detector circuit (14). The third feature is the generation of the reference signal from the attenuated envelope (10) via a voltage divider (17) and not directly from the detected envelope (7). The fourth feature is the use of a low-pass filter (18) to generate a reference signal (11) from the attenuated envelope (10) produced in the voltage divider (17). A fifth feature is the low-pass filter itself (as shown in FIG. 12), which is fed back with the demodulated data signal (12) of the circuit output (20). This feed-back enables to suppress rapid changes in the input signal (38) of the low-pass filter (FIG. 12), which must be filtered. Thus, the-low pass filter produces an average signal (11) very close to the amplitude maximum high value of the signal being filtered, as shown in FIG. 4. The feed-back scheme is used in both instances of low-pass filters; i.e.: both the polarization low-pass filter (16) and the average low-pass filter (18). The five features listed above can all be combined into a data detector circuit for RFIDs labels, featuring low power and high quality, or be used separately.

Figure 7:
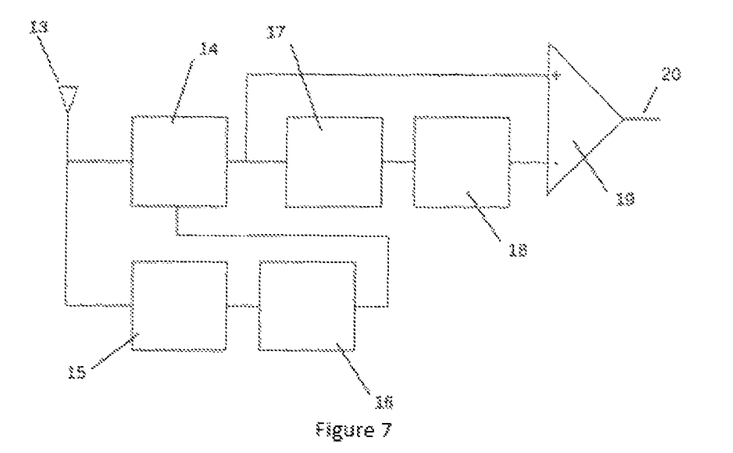
Figure 8:
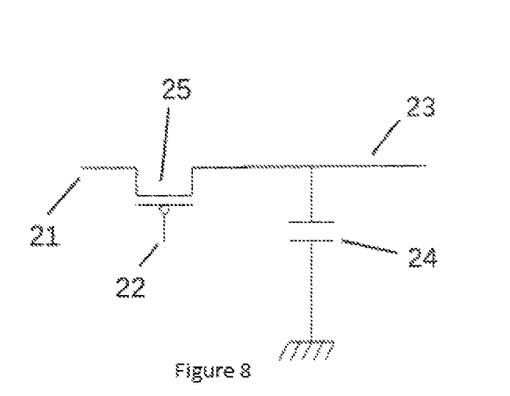
Figure 9:
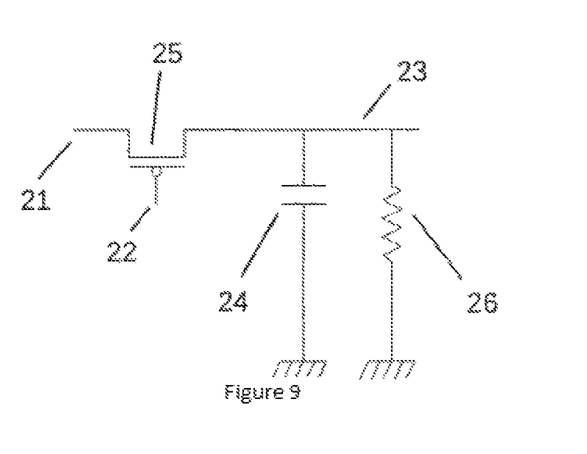
FIG. 9 shows the composition of the polarized detector circuit (14) including the output resistance (26) necessary for circuit operation. In the complete circuit in FIG. 7, the polarized detector circuit (14) can use the configuration in FIG. 8, because the resistive voltage divider (17) acts as the output resistance that would be missing in FIG. 8. Observe that the resistive divider (17) has its composition as shown in FIG. 11. To make it simple, the body terminal (or "bulk") of the transistor (25) is omitted in FIG. 9; the body terminal is connected to the output terminal (23) as well as the drain terminal of the transistor (25).
Figure 10:
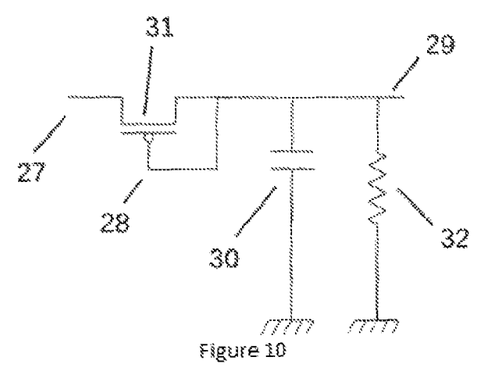
Figure 11:
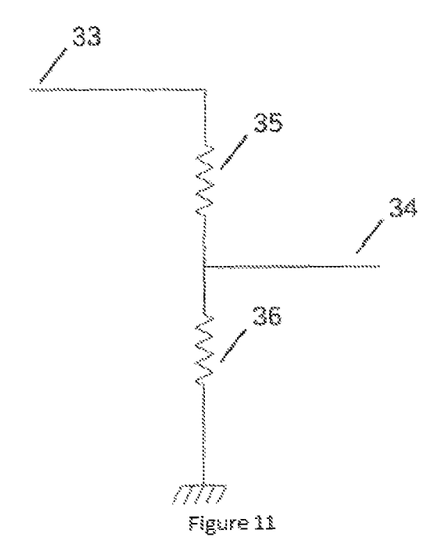
Figure 13:
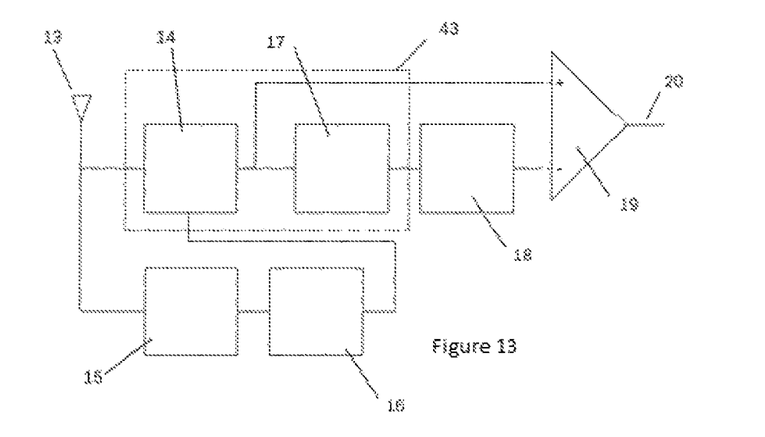
FIG. 13 shows a new version of the complete circuit, where the polarized detector circuit (14) and the voltage divider (17) are grouped in the same hierarchical block, indicated by the dotted box (43). The circuit block (43) receives as input signals the filtered polarization signal and the antenna signal (13), while providing as output, the detected package (7) and the attenuated package (10).

The topology of the complete circuit in FIG. 7 can be rearranged by hierarchical blocks. An example is shown in FIG. 13, where a new hierarchical block (43) is created including the polarized detector circuit (14) and the voltage divider (17). Similarly, the polarized detector circuit (14) and the polarizing detector circuit (15) could be grouped into a single hierarchy, without changing the invention. Therefore, it is important to realize that the inclusion of new hierarchical levels in the proposed invention does not modify the invention. It is important to observe that some blocks could be implemented differently than proposed. For example, there are several ways to implement a voltage divider, not all resistive as shown in FIG. 11. Similarly, there are several known implementations of low-pass filters different from that shown in FIG. 12. Using equivalents modules for the proposed features does not characterize different invention.

Figure 14:
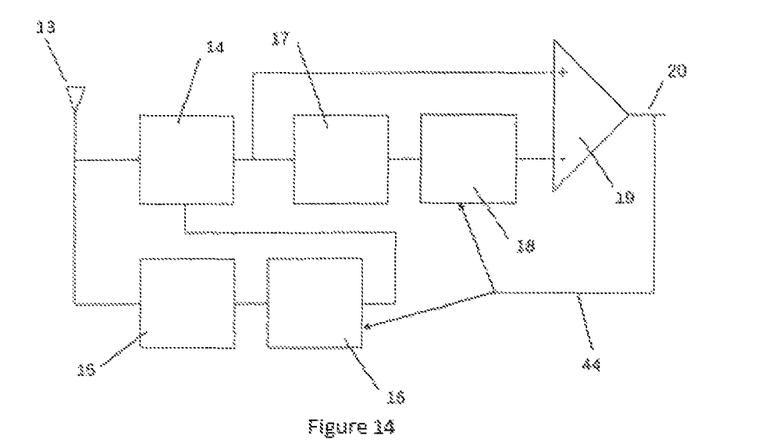
FIG. 14 shows another new version of the complete circuit, where the polarization low-pass filter (16) and the average low-pass filter (18) are fed back with the demodulated data signal (12) of the circuit output (20). The demodulated data is used as an external signal (37) in the low-pass filters to turn off the on/off switch (38) of current source i2 (39).
Figure 15:
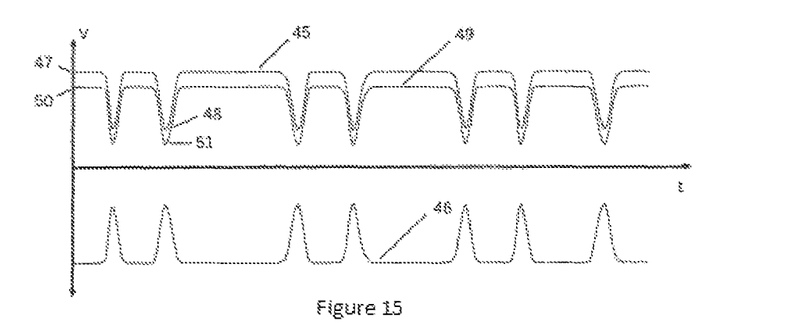
FIG. 15 shows the ratio between the received signal package (45) and the detected package (49) by the polarizing detector circuit (15). Note that the received signal has an upper envelope (45) and a lower envelope (46). The envelope detected (49) by the polarizing detector circuit (15) has a difference in potential very close to the PMOS transistor threshold voltage (31) of the polarizing detector circuit (15). Therefore, the difference between the maximum high value (47) of the upper envelope (45) of the received signal and the maximum high value (50) of the envelope detected by the polarizing detector circuit (15) corresponds to the threshold voltage of the PMOS transistor (31) of the polarizing detector circuit (15). Similarly, "the difference between the minimum high value (48) of the upper envelope (45) of the received signal and the minimum high value (51) of the envelope detected (49) by the polarizing detector circuit (15) corresponds approximately to the PMOS transistor threshold voltage (31) of the polarizing detector circuit (15).
Figure 16:
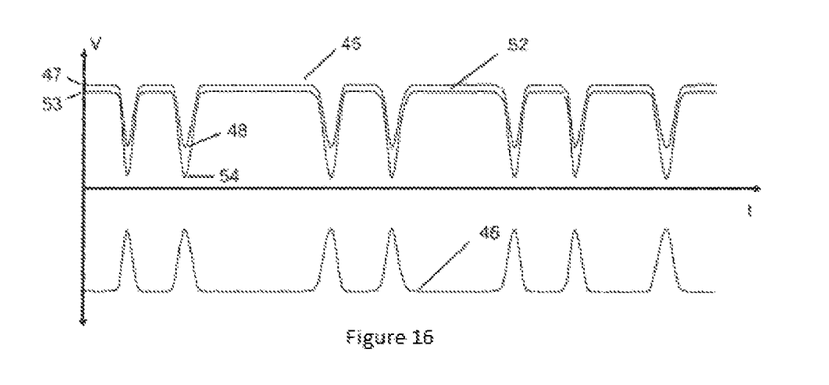
FIG. 16 shows the ratio between the envelope of the received signal (45) and the detected envelope (52) by the polarized detector circuit (14). Note that the received signal has an upper envelope (45) and a lower envelope (46). The envelope detected (52) by the polarized detector circuit (14) has a maximum high value (53) very close to the maximum high value (47) of the higher envelope (45) of the received signal. The envelope detected (52) by the polarized detector circuit (14) has a minimum high value (54) very close to zero.
Figure 17:
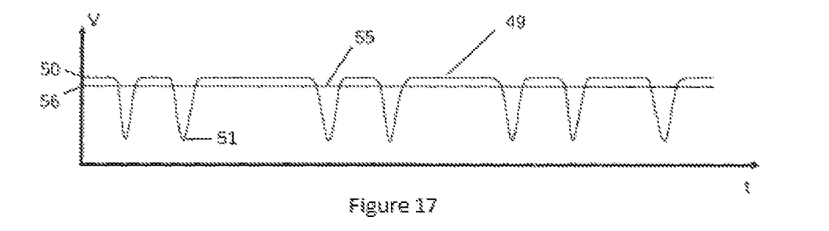
FIG. 17 shows the polarization average (55) calculated by the polarization low-pass filter (16) from the envelope detected (49) by the polarizing detector circuit (15). Note that the average polarization value (56) is very close to the maximum high value (50) of the envelope detected (49) by the polarizing detector circuit (15).
Figure 18:
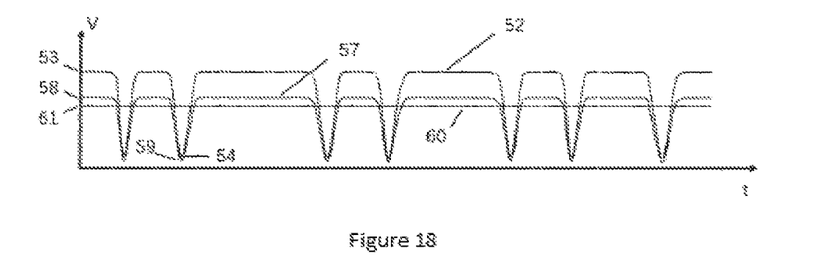
FIG. 18 shows the reference average (60) calculated by the reference low-pass filter (18) from the envelope detected (52) by the polarized detector circuit (14) attenuated by 75% (57). The envelope detected (52) by polarized detector circuit (14) is attenuated by 75% via the voltage divider (17), generating an envelope attenuated (57) by 75%. The reference average (60) calculated by the reference low-pass filter (18) from the envelope attenuated (57) by the voltage divider circuit (17). Note that the reference average value (61) is very close to the maximum high value (58) of the envelope attenuated (57) by the voltage divider circuit (17).
Figure 19:
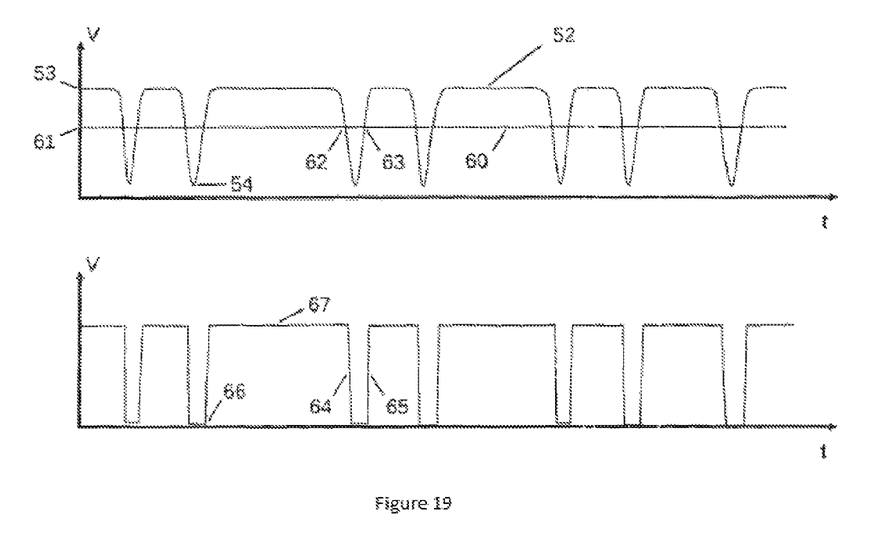
FIG. 19 shows the calculation of the data collected (67) from the envelope detected (52) by the polarized detector circuit (14) and the reference average (60). Note that the reference average value (61) is in an intermediate position related to the maximum high value (53) and to the minimum high value (54) of the envelope detected (52) by the polarized detector circuit (14).

Consider an example of signal processing through the complete circuit shown in FIG. 14, FIG. 15 shows the ratio between the received signal envelope (45) and the envelope detected (49) by the polarizing detector circuit (15). Note that the received signal has an upper envelope (45) and a lower envelope (46). The envelope detected (49) by the polarizing detector circuit (15) has a difference in potential very close to the threshold voltage of the PMOS transistor (31) of the polarizing detector circuit (15). Thus, the difference between the maximum high value (47) of an upper envelope (45) of the received signal and the maximum high value (50) of the envelope detected by the polarizing detector circuit (15) corresponds to the threshold voltage of the PMOS transistor (31) of the polarizing detector circuit (15). Similarly, the difference between minimum high value (48) of the upper envelope (45) of the received signal and the minimum high value (51) of the envelope detected (49) by the polarizing detector circuit (15) corresponds approximately to the threshold voltage of the PMOS transistor (31) of the polarizing detector circuit (15). FIG. 16 shows the ratio between the envelope of the received signal (45) and the envelope detected (52) by the polarized detector circuit (14). Note that the received signal has a higher an upper envelope (45) and a lower envelope (46). The envelope detected (52) by the polarized detector circuit (14) has a maximum high value (53) very close to the maximum high value (47) of the upper envelope (45) of the received signal. The envelope detected (52) by the polarized detector circuit (14) has a minimum high value (54) very close to zero. FIG. 17 shows the polarization average (55) calculated by the polarization low-pass filter (16) from the envelope detected (49) by the polarizing detector circuit (15). Note that the average polarization value (56) is very close to the maximum high value (50) of the envelope detected (49) by the polarizing detector circuit (15). FIG. 18 shows the reference average (60) calculated by the reference low-pass filter (18) from the envelope detected (52) by the polarized detector circuit (14) attenuated by 75% (57). The envelope detected (52) by the polarized detector circuit (14) is attenuated by 75% through the voltage divider (17) generating an attenuated envelope (57) by 75%. The reference average (60) calculated by the reference low-pass filter (18) from the envelope attenuated (57) by the voltage divider circuit (17). Note that the reference average value (61) is very close to the maximum high value (58) of the envelope attenuated (57) by the voltage divider circuit (17). FIG. 19 shows the calculation of the detected data (67) from the envelope detected (52) by the polarized detector circuit (14) and the reference average (60). Note that the reference average value (61) is in an intermediate position related to the maximum high value (53) and minimum high value (54) of the envelope detected (52) by the polarized detector circuit (14). When the detected envelope (52) crosses the reference average (60) in the negative direction (62), the detected data has a high-to-low transition (64). When the detected envelope (52) crosses the with the reference average (60) in the positive direction (63), the detected data has an low-to-high transition (65). Thus, it is possible to decode "1" (67) and "0" (66) binary states as encoded in the input signal. Note that in countries allowing method claims, this example allows to claim a method where signals are processed according to the above sequence, regardless the circuit or device that implements the method.

The invention claimed is:
1. A data detector circuit comprising:
 a polarizing detector circuit (15) that receives an input data signal to be detected (27) producing a polarization voltage signal (29);
 a polarized detector circuit (14) that receives said input data signal to be detected (21) and that receives said polarization voltage signal (22), producing a voltage signal reflecting an envelope (23) of said input signal to be detected (21).
2. The data detector circuit of claim 1 wherein said polarizing detector circuit (15) receives as input at least one signal that depends on the signal received by an antenna (13).
3. The data detector circuit of claim 2 wherein the output of said polarizing detector circuit (15) is connected to a polarization input of said polarized detector circuit (14).
4. The data detector circuit of claim 2 wherein said polarizing detector circuit output (15) is connected to a polarization input of said polarized detector circuit (14) via a low-pass filter (16).
5. The data detector circuit of claim 4 wherein a polarized detector output signal (14) is used to generate an average signal (11) after being attenuated by a voltage divider (17) and filtered by a low-pass filter (18).
6. The data detector circuit of claim 5 wherein the data being detected by a comparator circuit which compares a detected envelope signal (7) at said polarized detector output (14) with said average signal (11) to generate detected data (12) at a data detector circuit output (20).
7. The data detector circuit of claim 6 wherein said detected data (12) at said data detector circuit output (20) is fed back (44) to a pair of low-pass filters (16, 18), with a detected data (12) controlling an external signal (37) in said low-pass filters to turn off an on/off switch (38) of a current source i2 (39).
8. The data detector circuit of claim 1 wherein said polarizing detector circuit (15) is comprised of a PMOS transistor (31) with the source terminal of the transistor connected to an input (27) of said polarizing detector (15) and with the drain terminals and transistor gate connected to an output (29) of said polarizing detector (15).
9. The data detector circuit of claim 1 wherein said polarized detector circuit (14) is comprised of a PMOS transistor (25) with the source terminal of the transistor connected to the signal input (21) of said polarized detector (14), with the transistor gate terminal connected to the polarization input (22) of said polarized detector (14) and with the drain terminal of the transistor connected to the output of said polarized detector (23).
10. A data detector circuit comprising:
 a polarizing detector circuit (15) that receives an input data signal to be detected (27) producing a polarization voltage signal (29);
 a polarized detector circuit (14) that receives said input data signal to be detected (21) and that receives said polarization voltage signal (22), producing a voltage signal reflecting an envelope (23) of said input signal to be detected (21);
 wherein said polarizing detector circuit (15) is comprised of a PMOS transistor (31) with the source terminal of the transistor connected to an input (27) of said polarizing detector (15) and with the drain terminals and transistor gate connected to an output (29) of said polarizing detector (15); and wherein said polarized detector circuit (14) is comprised of a PMOS transistor (25) with the source terminal of the transistor connected to the signal input (21) of said polarized detector (14), with the transistor gate terminal connected to the polarization input (22) of said polarized detector (14) and with the drain terminal of the transistor connected to the output of said polarized detector (23).

11. The data detector circuit of claim 10 wherein said polarizing detector circuit output (15) is connected to the polarization input (22) of the polarized detector circuit (14).

12. The data detector circuit of claim 10 wherein the polarizing detector circuit output (15) is connected to the polarization input (22) of the polarized detector circuit (14) via a low-pass filter (16).

13. The data detector circuit of claim 10 wherein the polarized detector output signal (14) is used to generate an average signal (11) after being attenuated by a voltage divider (17) and filtered by a low-pass filter (18).

14. The data detector circuit of claim 13 wherein the data being detected by a comparator circuit that compares a detected envelope signal (7) at the polarized detector output (14) with the average signal (11) obtained to generate the detected data (12) at a circuit output (20).

15. The data detector circuit of claim 14 characterized by using the detected data (12) at the circuit output (20) is fed back to the low-pass filters (16, 18), with the detected data (12) controlling an external signal (37) in the low-pass filters to turn off an on/off switch (38) of the i2 current source (39).

* * * * *